United States Patent
Ahmed et al.

(10) Patent No.: US 8,316,112 B2
(45) Date of Patent: Nov. 20, 2012

(54) COMMUNICATIONS NETWORK SERVICE DEPLOYMENT SIMULATOR

(75) Inventors: Shahid Ahmed, Chicago, IL (US); Asheesh Saksena, Bridgewater, NJ (US); Ragnar-Miguel Myhrer, Atlanta, GA (US); Vaibhav Parmar, Durham, NC (US); Gustavo Talavera, Miami Beach, FL (US)

(73) Assignee: Accenture Global Services Limited, Dublin (IE)

( * ) Notice: Subject to any disclaimer, the term of this patent is extended or adjusted under 35 U.S.C. 154(b) by 355 days.

(21) Appl. No.: 12/434,167

(22) Filed: May 1, 2009

(65) Prior Publication Data
US 2009/0276265 A1 Nov. 5, 2009

Related U.S. Application Data

(60) Provisional application No. 61/049,726, filed on May 1, 2008.

(51) Int. Cl.
*G06F 15/177* (2006.01)
*G06F 15/173* (2006.01)
(52) U.S. Cl. .................. 709/220; 709/222; 709/223
(58) Field of Classification Search .......... 709/220–226; 370/241–253; 705/14.46
See application file for complete search history.

(56) References Cited

U.S. PATENT DOCUMENTS

| | | | | |
|---|---|---|---|---|
| 5,809,282 A | * | 9/1998 | Cooper et al. | 709/226 |
| 6,141,565 A | * | 10/2000 | Feuerstein et al. | 455/560 |
| 6,609,128 B1 | * | 8/2003 | Underwood | 707/610 |
| 6,829,491 B1 | * | 12/2004 | Yea et al. | 455/560 |
| 7,668,112 B2 | * | 2/2010 | Helfman et al. | 370/252 |
| 7,844,698 B2 | * | 11/2010 | Aoyama et al. | 709/224 |
| 2003/0050048 A1 | | 3/2003 | Abed et al. | |
| 2004/0261116 A1 | * | 12/2004 | Mckeown et al. | 725/109 |
| 2005/0038636 A1 | * | 2/2005 | Wakelam et al. | 703/1 |
| 2005/0108379 A1 | * | 5/2005 | Gray et al. | 709/223 |
| 2006/0083366 A1 | * | 4/2006 | Aoyama et al. | 379/114.01 |
| 2006/0168166 A1 | * | 7/2006 | Hardwick et al. | 709/221 |
| 2006/0234714 A1 | * | 10/2006 | Pollini et al. | 455/446 |
| 2007/0149186 A1 | * | 6/2007 | Barbosa da Torre et al. | 455/423 |
| 2007/0299746 A1 | * | 12/2007 | Haley et al. | 705/28 |
| 2008/0037532 A1 | * | 2/2008 | Sykes et al. | 370/389 |
| 2011/0055390 A1 | * | 3/2011 | Malloy et al. | 709/224 |

FOREIGN PATENT DOCUMENTS
EP 1496717 1/2005

OTHER PUBLICATIONS
U.S. Appl. No. 61/049,726.
* cited by examiner

*Primary Examiner* — Brendan Higa
(74) *Attorney, Agent, or Firm* — Mannava & Kang, P.C.

(57) ABSTRACT

A decision management system simulates a communications network service deployment using business and technology changeable parameters, a base case model, a network cost model and a bandwidth model. The simulations may be performed for different sets of changeable parameters to generate multiple candidate solutions. These solutions are analyzed to identify a solution for deploying the communications network service.

20 Claims, 6 Drawing Sheets

CHANGEABLE PARAMETERS 402
(X % AREA COVERAGE / X% POPULATION COVERAGE)

401

| DOMAIN 410 | DESCRIPTION 420 | CAPEX 430 | OPEX YEAR 5 RUN RATE 440 |
|---|---|---|---|
| RADIO COSTS | CELL SITE COSTS-CURRENT INFRASTRUCTRE + DEPLOYMENT | $X BILLION | $XMILLION |
| BACKHAUL COSTS | TRANSPORT FROM CELL SITES TO CORE NETWORK | $X MILLION | $X MILLION |
| CORE NETWORK COSTS | SWITCHING AND IMS CORE (INCLUDING BUILDING SPACE) | $X MILLION | $X MILLION |
| OPERATIONS | OPERATIONAL, BUSINESS SUPPORT SYSTEMS, NOC, NETWORK OPS PERSONNEL, IT | $X MILLION | $X MILLION |

COMMUNICATIONS NETWORK SERVICE DEPLOYMENT SIMULATOR

PRIORITY

This application claims priority to U.S. provisional patent application Ser. No. 61/049,726, filed May 1, 2008, and entitled "4G Solutions Accelerator", which is incorporated by reference in its entirety.

BACKGROUND

Companies, such as traditional communications network service providers (e.g., cellular service providers, cable service providers, satellite service providers, etc.), application-specific service providers, and other types of companies face great competitive pressure to provide the best service to their customers and to develop and deploy new services to the marketplace faster than their competitors.

For example, fourth generation wireless (4G) network technology (e.g. WIMAX, Long Term Evolution (LTE), etc.) is widely accepted as the next major milestone in wireless technology evolution, and impacts business models in the wireless industry as well as wireless technology. Most cellular service providers have hardly had time to profit from their third-generation (3G) wireless networks, and now they need to strategize about how to realize a return on that investment while simultaneously making a move to 4G wireless broadband services.

To be competitive, companies try to minimize short-term risks while at the same time support longer-term capabilities that enable the rapid creation of innovative and profitable services. However, it is difficult to undergo a comprehensive analysis to enable educated decisions for the rapid creation and deployment of innovative and profitable services. For example, in the case of a company strategizing about how to maximize a return on investment while simultaneously making a move to 4G wireless broadband services, the company would ideally undergo a comprehensive analysis on the impact of deploying 4G services on their current services as well as the impact on short and long term profits. However, due to the cost, difficulty and know-how needed for undergoing such an analysis, many companies may fall short in their analysis, possibly resulting in lost profits. Furthermore, building or expanding a wireless network is highly capital intensive. It requires holistic and programmatic decision making. One incorrect assumption can mean lost revenue opportunity and conversely cost over-runs costing jobs and economic productivity.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

According to an embodiment, a comprehensive decision management system uses quantative methods and changeable parameters to simulate and analyze different communication network service deployments. The simulations and analysis may then be used to identify optimal service deployment scenarios to maximize business as well as technological objectives. Also, the decision management system may be used by companies or other entities to strategize about their existing network investments while simultaneously deploying new technologies and services.

A service as used herein includes the supplying or providing of information over a network, and is also referred to as a communications network service. Examples of services include 4G broadband services, any voice, data or video service provided over a network, smart-grid network, digital telephone service, cellular service, Internet protocol television (IPTV), etc.

The decision management system includes a scenario-based simulator to simulate different scenarios encompassing different changeable parameters or variables for services to be deployed. The simulator uses a multi-linear simulation engine to run simulations for different scenarios. The output of the simulator includes an analysis of each scenario and an analysis of business and technology sub-solutions for each simulation. A solution includes an analysis of different factors for deploying a service given changeable parameters, constraints, and existing service parameters, if any. Sub-solutions provide an analysis of different categories of the factors. For example, a business sub-solution includes an analysis of business factors. A technology sub-solution includes an analysis of technology factors. The simulations are operable to take into consideration existing implementations of infrastructure, operations and services, and can be used to evaluate the impact on the existing services.

The decision management system provides a complete, holistic, end-to-end analytic and support solution that helps companies engage in sophisticated modeling and "what-if" planning based on different business, technology and cost variables. The decision management system is operable to consider business cost variables, operational cost variables, and technological variables, and provides a comprehensive analysis across all these domains as well as an indication of how the variables in the different domains impact each other. A domain is a logical sectioning of a service. In one example, domains of a 4G service include a radio domain, a backhaul domain, a core network domain, and an operations domain. Changes in one domain may impact changes in another domain, which is captured in the modeling described herein. This type of decision management system is invaluable for communications providers to get a complete picture and understanding of costs and potential profits for service deployments, as well as providing practical guidelines and what-if analysis for evaluating various network solutions. Furthermore, the decision management system can provide analysis of different scenarios in real time. Thus, the impact of changing different variables in different domains to achieve a business objective can be quickly evaluated.

Figure 1:
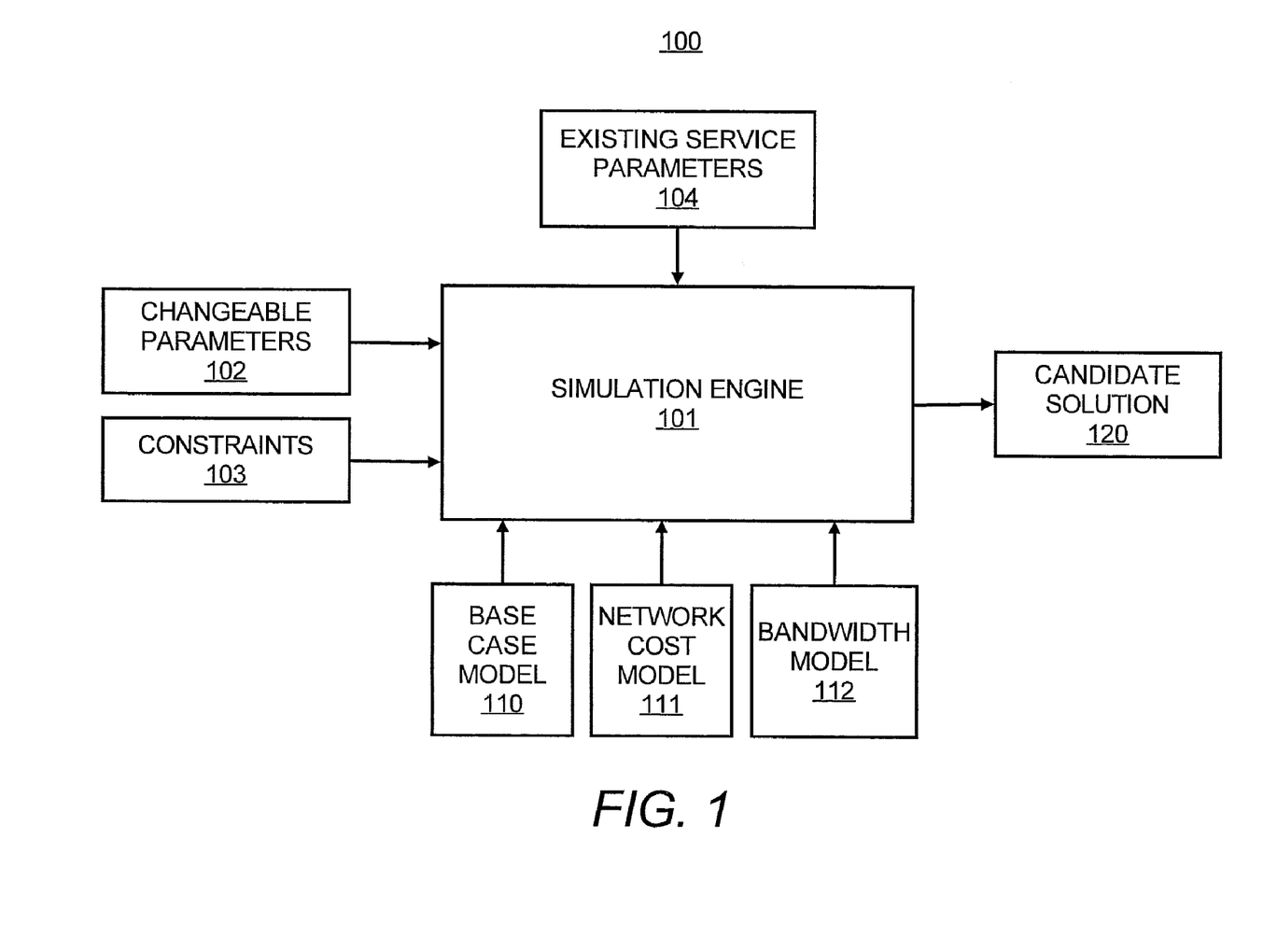
FIG. 1 illustrates a decision management system, according to an embodiment.

FIG. 1 illustrates a decision management system 100, according to an embodiment. The decision management system 100 includes a simulation engine 101, a base case model 110, a network cost model 111, and a bandwidth model 112. The simulation engine 101 receives inputs, including one or more of changeable parameters 102, constraints 103, and existing service parameters 104, that may be entered by a user on a graphical user interface. From these inputs and the models 110-112, the simulation engine 101 simulates the deployment of a communications network service. The simulation engine 101 generates an analysis of the simulation, which is shown as candidate solution 120. A candidate solution is a solution that may be selected to be used to deploy the service. Multiple candidate solutions can be determined and one may be selected for deploying the service. For example, the changeable parameters 102 may be varied to generate different candidate solutions. Each candidate solution can be analyzed to determine the solution that best satisfies one or more objectives. According to a preferred embodiment of the invention, one or more reports may be generated for each candidate solution that presents an analysis of the candidate solution. A user may compare the analyses of each candidate solution. For example, a solution may be selected that minimizes costs but provides the best customer experience based on quality of service (QoS) or Radio Frequency (RF) coverage constraints related to technology.

The constraints 103 are requirements that may be provided by the service provider. The constraints 103 must be met by the deployed service. One example of a constraint is a QoS constraint. Another constraint may be a budget constraint. The existing service parameters 104 describe existing network infrastructure and services. The deployment of a new service may impact or be impacted by existing network infrastructure and services. For example, a new service may be cheaper to implement when largely supported by the existing network infrastructure. In another example, existing operations, such as customer help desk or technicians, may be leveraged to support new services.

As described in more detail later, the base case model 110, network cost model 111, and bandwidth model 112 take into consideration business and technology factors across multiple domains that can be used to simulate deploying of a communications network service. These factors are implemented in the models, and these factors when implemented in the models are referred to as model parameters. Relationships, described below, between the model parameters are used during the simulations to generate the candidate solutions for deploying the service. Deploying of a service may include building network infrastructure, providing the service, and maintaining the service after it is operational.

Each of the models 110-112 include different business and technology model parameters that may be derived from a historical analysis of various communication network service deployments, and also may be derived from a determination of the type of information that is needed to analyze deployment of a service. For example, if a particular type of equipment is needed for a service deployment, then cost of that equipment may be used as a model parameter. The model parameters may include but are not limited to traditional types of costs and traditional technology variables that affect the service. Examples of different model parameters for each of the models 110-112 are described below.

Models may be provided based on domain. A model may include model parameters that are associated with one domain or mostly associated with one domain. However, models do not need to be based on domain.

The simulation generates values for the model parameters. A value for a model parameter is an instance of the model parameter. For example, if a model parameter is capital cost for equipment, then a value for that factor is a monetary amount, such as 28.3 million dollars. The values determined for the factors are estimations based on relationships between the model parameters as well as inputs, such as the changeable parameters and/or other inputs for the simulation. As used herein, model parameters that are related are referred to as dependent model parameters. If a model parameter is dependent on another model parameter in the same or a different model, those model parameters may also be referred to as corresponding parameters that are dependent.

The relationships between dependent model parameters are stored in each of the models, and these relationships may be stored as relationship curves or some other type of mapping. A curve can describe the relationships between dependent model parameters. For example, a curve may capture that if a value of a dependent model parameter exceeds a threshold, then the value for the corresponding dependent model parameter may level off and maintain a certain value even if the other dependent model parameter continues to get larger. Examples of relationships are described in further detail below. Note that the values in the curves may be derived from a historical analysis of the model parameters. Also, note that the relationships in the models may be between one or more inputs to the simulation engine 101 and one or more model parameters. Additionally, relationships may exist between more than two model parameters, and relationships may be dependent on other relationships. Also, relationships may be between different domains.

The base case model 110 analyses both capital and operational costs. Examples of values for capital cost include labor rates and capital costs for building and operating the network to provide the communications network service. The operation costs estimate the ongoing costs of running the service. These costs are based on the operational aspect of the service, such as labor rates for end-user customer support and network infrastructure maintenance personnel. Material costs may include cost of replacement equipment. These values may vary depending on the type of technology selected for deploying the service.

The network cost model 111 helps estimate the expenditures associated with building the network for providing the service. The network cost model 111 may include values that impact capital and operational costs in the base case model 110. Examples of costs in the network cost model 111 for a wireless service, such as a 4G service, include radio costs, such as cell site costs, backhaul costs, which are related to infrastructure costs from the core network to the edge (e.g., cell sites), and core network costs, such as switches and building space.

The bandwidth model 112 helps estimate network bandwidth requirements for the service or combinations of services, such as voice, data and video services. The bandwidth model is especially useful for these type of services, because each of these types of services offers a different profile from a capacity, a coverage and a performance standpoint. Operators can factor findings from this analysis into their network cost model to provide a more detailed picture of build-out costs. Based on the expected bandwidth demand, the bandwidth model 112 helps set the dimensions of the transport network and predicts yearly bandwidth costs. For example, the bandwidth model 112 is used to determine bandwidth needed based on coverage area, number of customers, type of service, and other values.

The models identify relationships between domains as well as relationships between different model parameters in different models. These relationships are stored in the models. The simulation engine 101 uses the relationships to generate the candidate solution 120. Furthermore, as a result of varying one or more of the changeable parameters 102, these relationships may identify changes to different costs associated with different models, and ultimately are used to generate different candidate solutions.

Figure 2:
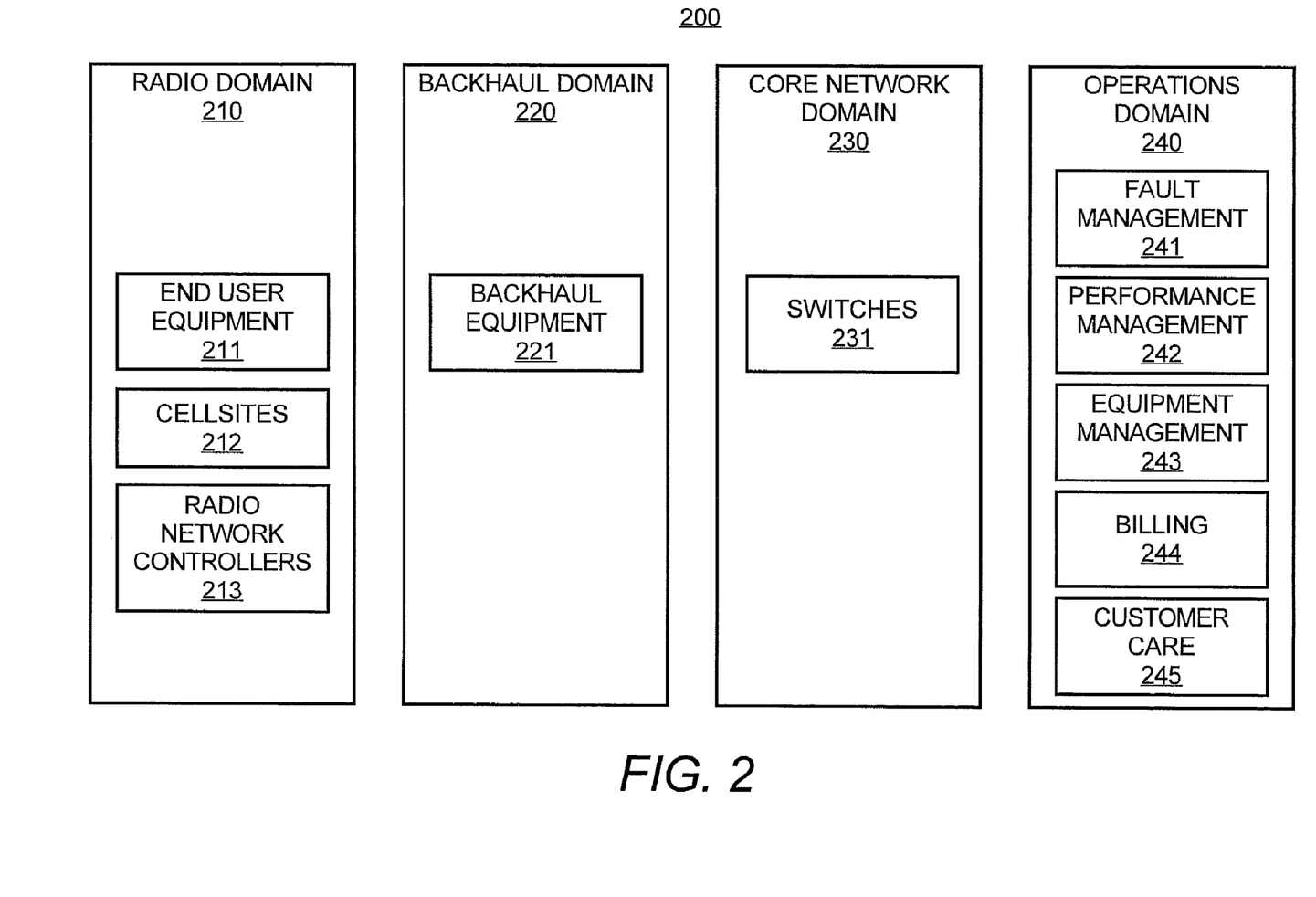
FIG. 2 illustrates domains in a communications network service, according to an embodiment.

FIG. 2 shows different domains for a communications network service deployment. In this example, the service being deployed is a 4G service, and thus needs a wireless cellular network as well as a backhaul and core network with connections to the Internet. The 4G service may include providing multimedia applications to the user via a 4G network. The domains include a radio domain 210, a backhaul domain 220, a core network domain 230, and an operations domain 240. The radio domain 210 may include end user equipment 211 with a cellular interface, such as cell phones, laptops, etc. The radio domain 210 may also include cell sites 212, and radio network controllers 213. The backhaul domain 220 includes backhaul equipment 221. This may include controllers and cabling, such as optical fiber carrying data between the cellular network and the core network. The core network domain 230 includes switches 231. The switches 231 may include general packet radio service (GPRS) nodes commonly used for global system for mobile communications (GSM) systems for transmitting Internet Protocol (IP) packets. The operations domain 240 may include multiple systems, such as a fault management system 241, a performance management system 242, an equipment provisioning system 243, a billing system 244, and a customer care system 245, as well as equipment and personnel needed for each system and aspect of operations.

Figure 3:
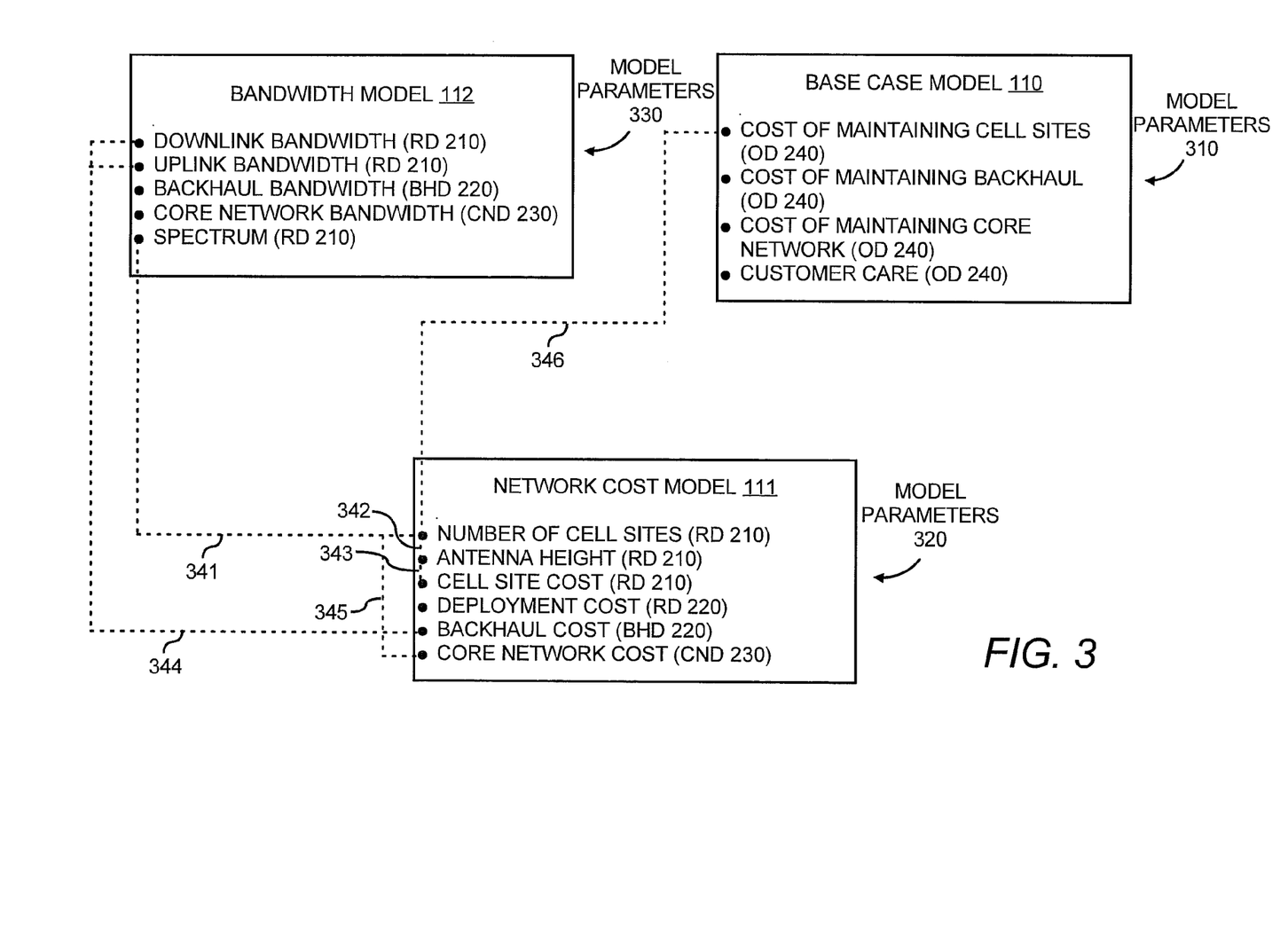
FIG. 3 illustrates relationships between values in models, according to an embodiment.

FIG. 3 shows examples of model parameters 310, 320, and 330 for the base case model 110, network cost model 111 and the bandwidth model 112, respectively, from FIG. 1. FIG. 3 also shows relationships between the model parameters 310-330 in the different models 110-112 and also identifies the domains 210-240 associated with the model parameters. The radio domain 210, the backhaul domain 220, the core network domain 230, and the operations domain 240 are shown in FIG. 3 as RD 210, BHD 220, CND 230, and OD 240, respectively, for each of the model parameters 310-330. The changeable parameters 102 shown in FIG. 1 may identify an end user coverage area to receive the 4G service, an estimated number of users in various areas in the coverage area, and may also identify a downlink bandwidth of 124 kbps to the end user. Based on these parameters, the simulation engine 110 uses the bandwidth model 112 to identify bandwidth requirements for the domains. The downlink bandwidth was provided in this example as a changeable parameter, and is shown as a model parameter for the bandwidth model 112. In another example, the downlink bandwidth as well as an uplink bandwidth may be estimated by the simulation engine 101 based on the type of service being deployed and other factors. Another model parameter for the radio domain is the total spectrum required. If less spectrum is available, then more cell sites may be needed to account for demand.

Other model parameters determined using the bandwidth model 112 may include bandwidth needed per channel for the backhaul domain 220 and the core network domain 230. These model parameters may be determined based on the bandwidth requirements for the type of service being deployed, the number of end users, and other factors.

The model parameters 320 for the network cost model 111 may include number of cell sites, cell site cost, and deployment cost, which can vary depending on whether the site is co-located with another site or a new build, backhaul cost, and core network cost. Relationships between different model parameters in the models are shown as lines connecting the values. For example, relationship 341 shows that the number of cell sites may vary according to the bandwidth spectrum needed for the service. If less spectrum is available, then more cell sites may be needed to account for demand. Spectrum and number of cell sites are referred to as dependent parameters because there is a relationship between the parameters. Also, each dependent parameter has at least one corresponding dependent parameter in a relationship. For example, the number of cell sites is a dependent parameter and the spectrum is the corresponding dependent parameter or vice versa.

Relationship 344 indicates a relationship between cell site bandwidth (e.g., uplink and downlink) and backhaul and core network costs. For example, backhaul costs are driven by the cost per megabit (Mb) needed at the site and for the backhaul transport. Core network costs are also driven by the bandwidth needed at the cell site.

Relationships 341 and 344 represent inter-model relationships. Intra-model relationships among model parameters also exist. For example, the backhaul and network costs shown under network cost model 111 may increase as the cell site density increase (shown as relationship 345).

Relationships may be inverse or direct. For example, relationship 342 shown for network cost model 111 is between the number of cell sites and the antenna height. This relationship is inverse, because a decrease in antenna height per cell site results in less coverage, and as a result more cell sites are needed. Other relationships are direct. For example, relationship 343 represents that using antennas with greater height increases cost per cell site. It should be noted that relationships, whether inverse or direct, may not be linear. For example, after a certain cell site density is reached, an increase in coverage requirement or an increase in bandwidth requirement may be accommodated by the current cell site density.

The model parameters 310 are for the base case model 110. Examples of the model parameters 310 may include costs of maintaining cell sites, the backhaul, and core network and a cost for customer care. Relationship 346 represents a relationship between number of cell sites and cost of maintaining the cell sites. For example, as the number of cell sites increases, maintenance costs may also increase. The costs of maintaining the backhaul and core network may have similar relationships based on the size of the backhaul and core network. Customer care costs are related to the number of subscribers.

As shown by the example of relationships 341-346, relationships may be between different model parameters in different models as well as between model parameters in the same model. Relationships may be inverse or direct. Also, the relationships may be between domains. For example, relationship 344 represents a relationship between the radio domain 210 and the backhaul and core network domains 220 and 230. Furthermore, a relationship may be between a single model parameter and multiple model parameters or may be between a first set of multiple model parameters and a second set of multiple model parameters. In addition, the relationship may be a multi-hop relationship. For example, an increase in spectrum requirements may cause an increase in the number of cell sites (e.g., relationship 341), which causes an increase in the cost of maintaining the cell sites (e.g., relationship 346).

The relationships are stored in the models 110-112. Thus, as model parameters in the models or the changeable parameters are varied, the resulting changes to other model parameters are captured by the simulation performed by the simulation engine 101 shown in FIG. 1. Furthermore, the resulting changes are identified in different candidate solutions generated by the simulation engine 101.

As described above, the simulation engine 101 uses curves or other types of mappings (e.g., tables) in the models to estimate values for dependent model parameters. The values in the curves may be substantially fixed or may be changed to improve the accuracy of the simulation. For example, if a model parameter is based on a standard or is vendor-specific, the values for the curves involving that model parameter may not be changed unless the standard changes or the vendor changes. In other instances, the model parameters are not as static. In these instances, data may be retrieved from external sources to determine values for the curve. This may include real-time gathering, such as accessing information on the Internet or accessing public or private databases, to retrieve information that may be pertinent to the dependent model parameters. For example, if a model parameter is an equipment cost, then costs for different equipment manufacturers may be retrieved and averaged to determine values for curves using that model parameter. This type of value updating may improve the accuracy of the simulation because the curves are updated with the most recent information.

The candidate solutions provide an analysis of different factors given the changeable parameters 102, the constraints 103, and existing service parameters 104, if any. The analysis may be presented in reports generated by the simulation engine 101. The reports express values for the model parameters from the models 110-112 and other values, which may be derived from the values in the models 110-112.

Figure 4:
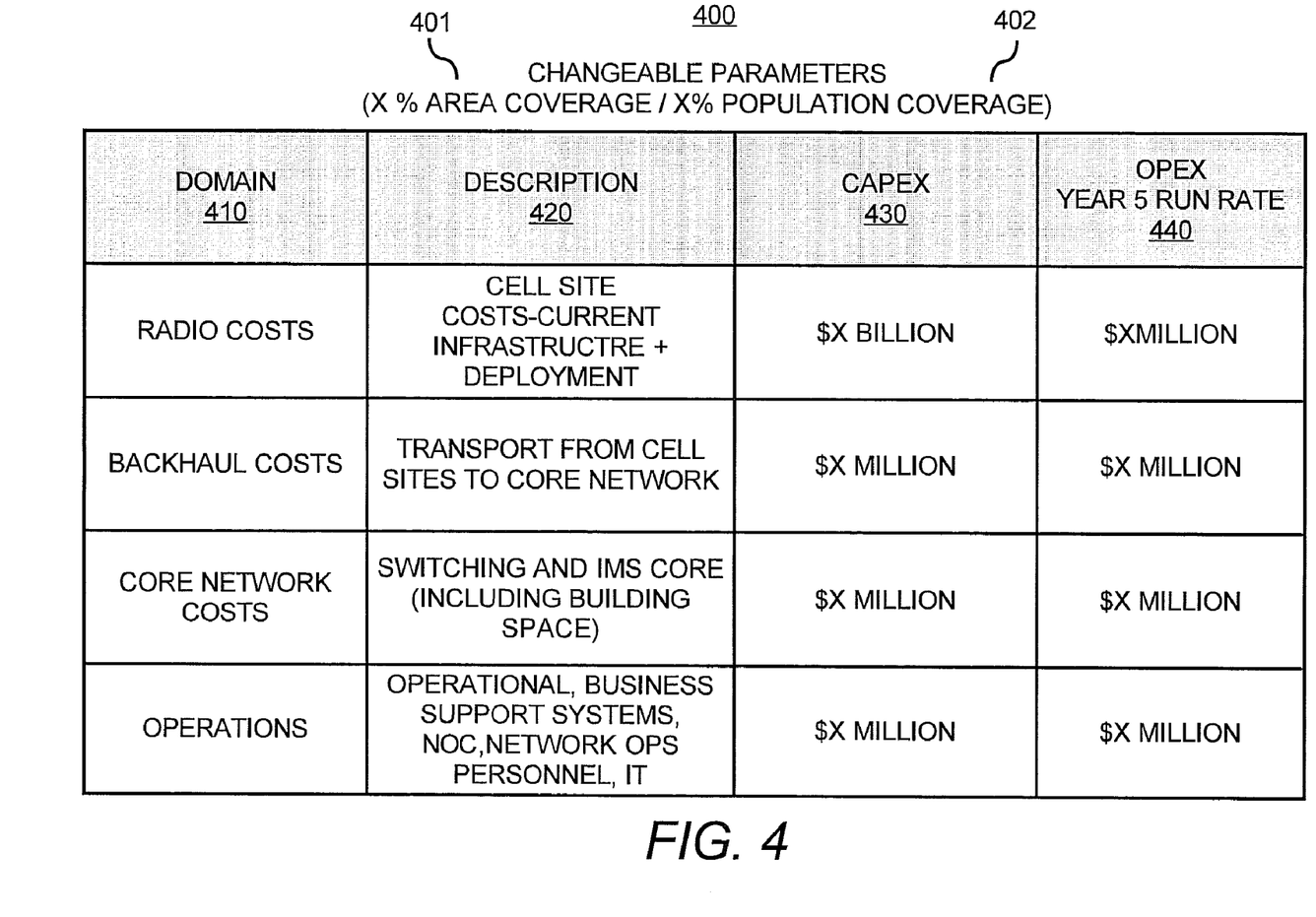
FIG. 4 illustrates an analysis report of a candidate solution, according to an embodiment.

FIG. 4 shows a simplistic example of information in a report 400 providing a breakdown of costs for the domains 210-240 of FIG. 2. The changeable parameters in this example are a percentage of area coverage 401 and a percentage of population coverage 402. These changeable parameters may be varied by the user. Although not shown, constraints may be specified.

The report 400 shows the domain 410, the description 420, the capital expenditure (CAPEX) 430, and the operations expenditure (OPEX) 440. The domain 410 includes the radio domain, the backhaul domain, the core network domain, and the operations domain. The description 420 provides a description of the costs for each domain. The CAPEX 430 shows the costs for each domain. The OPEX 440 shows the operational costs for each domain estimated for a 5 year run rate. Examples of other information that may be provided in the report include but are not limited to an estimation of consolidated financials and valuation of products and services, subscriber penetration projections, and revenue estimations.

A user may vary the changeable parameters to generate different candidate solutions. For example, a service provider is weighing different market penetration scenarios as well as different bandwidth requirements to help determine an optimal wireless broadband networking strategy. The decision management system 100 generates candidate solutions in real-time projecting business results for a 4 percent market penetration versus a 2 percent penetration. The service provider also assesses the cost impacts of different network speeds, such as a 124 kbps downlink versus a 64 kbps downlink. The candidate solutions help determine the impact of different strategic and technological options based on a five-year cost structure and on a net present value. The decision management system 100 provides decision-making confidence across multiple business and technology dimensions.

For a 4G service, the decision management system 100 may also be used to sort through the pros and cons of a variety of different access technologies, which enables the analysis of strengths and weaknesses in a company's existing technology infrastructure. The system 100 can be used as a planning tool to create the most cost-effective and integrated approach to a company's business support systems and operations support systems.

Filters may also be used to generate reports with the desired model parameters. A filter filters out the model parameters that are not needed for the report. For example, a chief technology officer may need to focus on model parameters in a technology sub-solution. A filter can be used that generates a report including only model parameters related to the technology sub-solution for the service deployment. Reports can be customized with the desired model parameters as needed.

Figure 5:
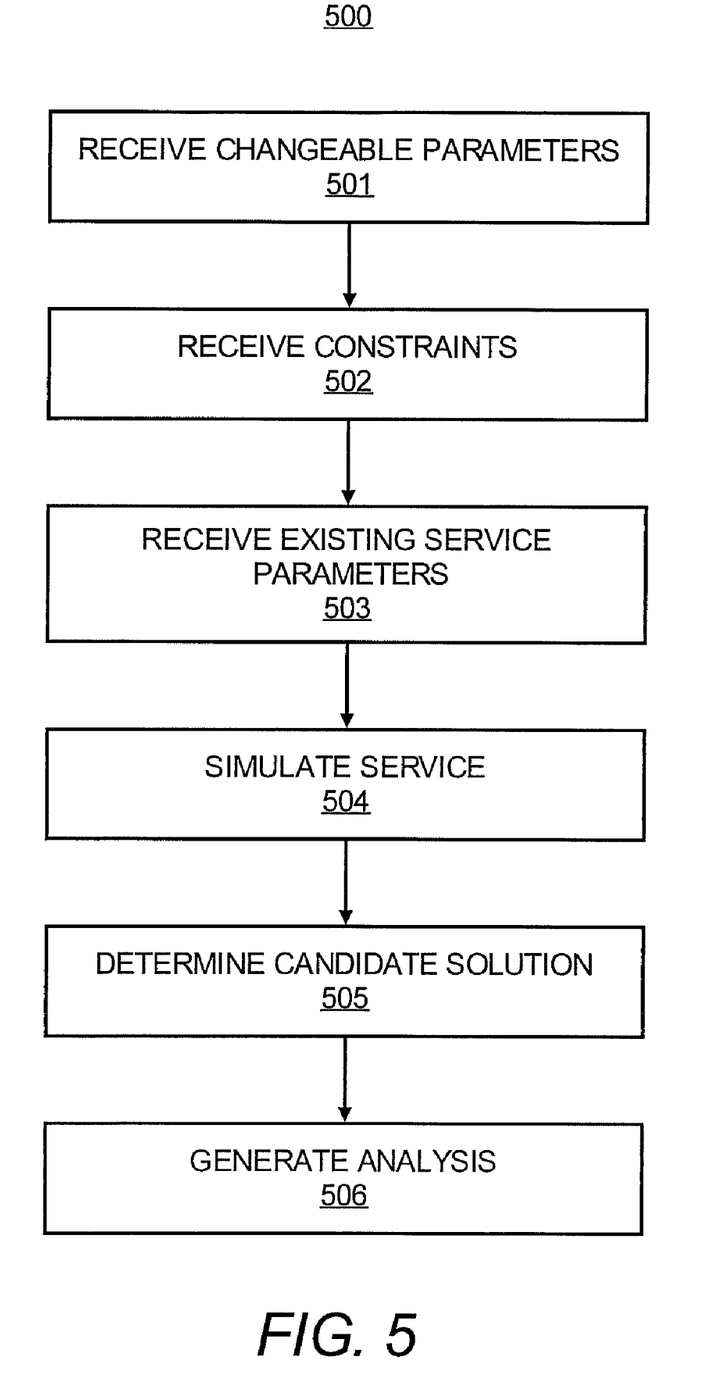
FIG. 5 illustrates a method for simulating service deployment, according to an embodiment.

FIG. 5 illustrates a method 500 for modeling and analyzing scenarios for a communications network service to be deployed. The method 500 is described with respect to one or more of FIGS. 1-4 by way of example. The method 500 may be practiced in other systems.

At step 501, changeable parameters are received. For example, the changeable parameters 102 shown in FIG. 1 may include business and technology changeable parameters. Business parameters are related to financial data for the service to be provided, such as costs, revenue, profit, budget, etc. Technology parameters relate to technology data for the service. Examples include coverage area, downlink bandwidth, QoS, etc. The changeable parameters may be provided from a user via a user interface.

At step 502, constraints are received. These may include parameters that must be met by the service to be deployed. For example, a certain level of QoS for a service may be required to provide the service, and a budget constraint identifies maximum expenditure.

At step 503, existing service parameters are received. These parameters describe an existing service. For example, a service provider planning on deploying a 4G service, may already provide 3G services. Business and technology parameters describing the 3G service are provided.

At step 504, the service to be deployed is simulated using one or more of the changeable parameters, constraints, and existing service parameters. The system 100 is used to simulate the service. The simulation is performed using the base case model 110, the network cost model 111, and the bandwidth model 112. For example, the models 110-112 store relationships between model parameters. The inputs, such as the changeable parameters, constraints, and existing service parameters, are determined. Values for a first set of model parameters dependent on these inputs are determined based on the stored relationships. Also, values for a second set of model parameters dependent on the first set of model parameters are determined based on stored relationship, and so on until values are determined for all or most of the model parameters.

For example, the relationship 341 shown in FIG. 3 represents that the number of cell sites may vary according to the bandwidth spectrum needed for the service. The number of cell sites is described as a dependent model parameter dependent on the corresponding spectrum model parameter. The relationship may indicate that if less spectrum is available, then more cell sites may be needed to account for demand. The bandwidth model 112 stores an indicator that the spectrum model parameter is related to the number of cell sites model parameter in the network cost model 111. The bandwidth model 112 may also store a relationship curve that is used to identify the estimated number of cell sites for a spectrum model parameter value. Thus, given a value for the spectrum model parameter, a value for the number of cell sites model parameter is determined from the curve. Then, the models may store a relationship between number of cell sites and capital costs, and a value for capital costs may be determined at least partially based on the number of cell sites. Curves may be based on historic values for existing services. The simulation engine 101 uses the curves to estimate the values for model parameters. These type of mappings for the relationships may be stored for sets of related values, and are used to make educated estimations for the candidate solution.

At step 505, a candidate solution is determined from the simulation, and at step 506 an analysis is generated describing the candidate solution. The candidate solution include the business and technology sub-solutions related to financial data and technology data describing the service to be deployed. The generated analysis may include reports describing the sub-solutions. FIG. 4 shows an example of a report. The reports include the values for the model parameters determined from the simulations. The reports may be used to compare different candidate solutions. For example, the method 500 is repeated for different sets of changeable parameters. Each candidate solution is analyzed to determine which best satisfies business and technology objectives.

Figure 6:
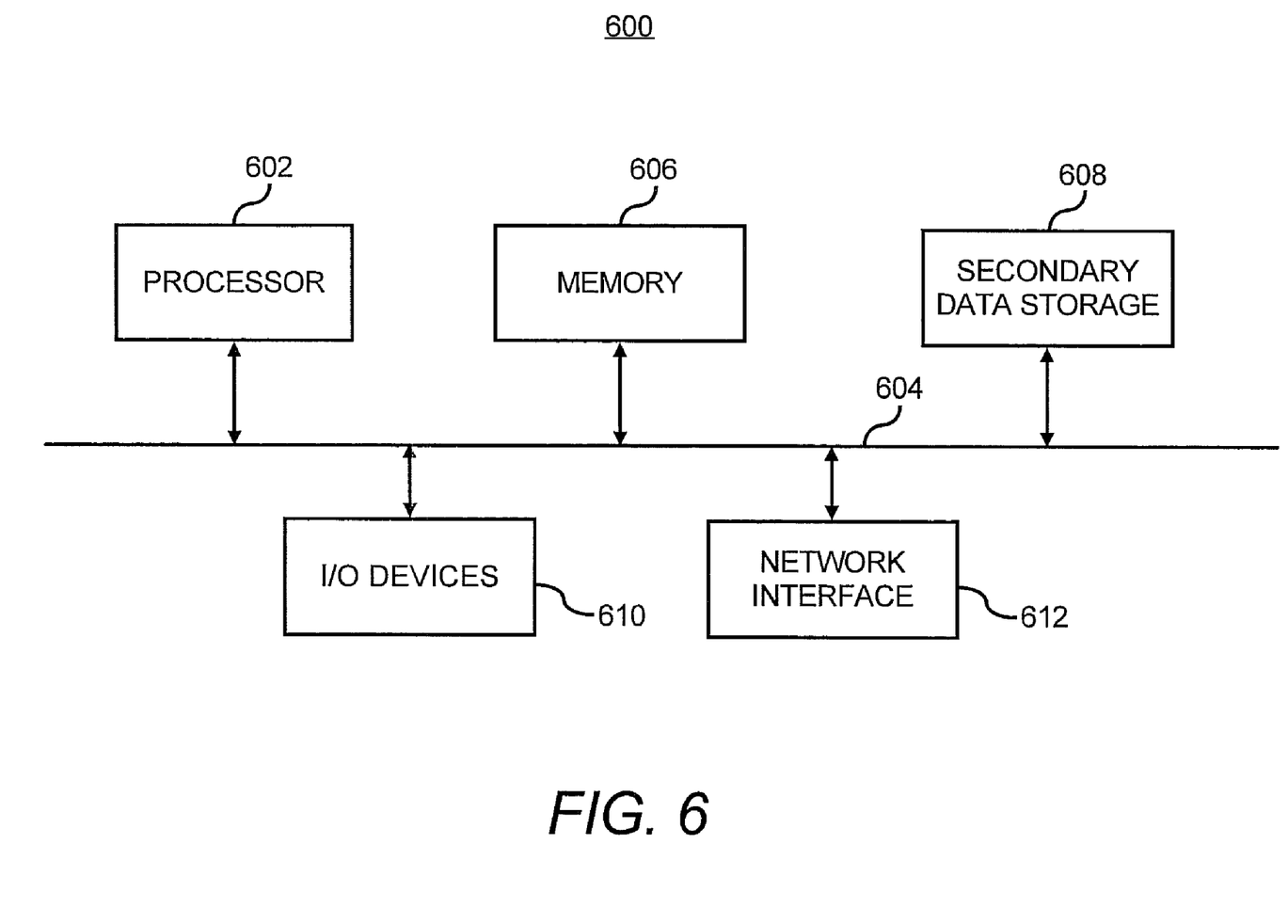
FIG. 6 illustrates a computer system that may be used as a platform for the decision management system and executing various functions, according to an embodiment.

FIG. 6 shows a computer system 600 that may be used with the embodiments described herein. The computer system 600 represents a generic platform that includes components that may be in a server or other computer system. The computer system 600 may be used as a platform for executing one or more of the methods, functions, and steps described herein. These steps may be embodied as software stored on one or more computer readable storage mediums.

The computer system 600 includes a processor 602 that may implement or execute software instructions performing some or all of the methods, functions and other steps described herein. Commands and data from the processor 602 are communicated over a communication bus 604. The computer system 600 also includes a main memory 606, such as a random access memory (RAM), where the software and data for processor 602 may reside during runtime, and a secondary data storage 608, which may be non-volatile and stores software and data. The memory and data storage are examples of computer readable storage mediums.

The computer system 600 may include one or more I/O devices 610, such as a keyboard, a mouse, a display, etc. The computer system 600 may include a network interface 612 for connecting to a network. It will be apparent to one of ordinary skill in the art that other known electronic components may be added or substituted in the computer system 600.

The models 110-112 in the decision management system 100 may be stored in a database provided in the secondary data storage 608. The simulation engine 101 may be executed by the processor 602 to generate the candidate solution 120. Also, a user interface for the system 100 may be generated by the processor 602 and presented using the I/O device 610. The user interface can output reports for the candidate solutions and receive user input, which may include parameters 102 and 104 and constraints 103.

One or more of the steps of the methods described herein and other steps described herein and one or more of the components of the systems described herein may be implemented as computer code stored on a computer readable storage medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable storage medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A non-transitory computer readable storage medium including instructions executed by a computer system to perform a method for simulating and analyzing one or more scenarios for a communications network service to be deployed, the method comprising:
    receiving business and technology changeable parameters describing the communications network service to be deployed;
    simulating the service using the business and technology changeable parameters, a base case model, a network cost model, and a bandwidth model to determine at least one candidate solution for deploying the service, wherein the base case model, the network cost model, and the bandwidth model each include a model parameter intradependent on a corresponding model parameter in at least one of the base case model, the network cost model, and the bandwidth model, wherein the at least one candidate solution includes business and technology sub-solutions;
    accessing real-time information pertinent to the model parameters;
    assigning values to the model parameters based on the real-time information; and
    generating an analysis of the at least one candidate solution to evaluate an impact of the changeable parameters,
    wherein generating the analysis includes generating the analysis of the at least one candidate solution across multiple domains of the service, and each domain is a logical sectioning of the service, and each domain is associated with a different technology for providing the service, and changes in one domain impact changes in another domain.

2. The non-transitory computer readable storage medium of claim 1, wherein each dependent model parameter varies based on a predetermined relationship with its corresponding dependent model parameter.

3. The non-transitory computer readable storage medium of claim 2, further comprising:
    storing mappings that represent the predetermined relationships.

4. The non-transitory computer readable storage medium of claim 3, further comprising:
    changing values in the mappings based on the real-time information.

5. The non-transitory computer readable storage medium of claim 1, wherein the method further comprises:
    receiving parameters describing existing technology or services; and
    the simulating uses the received parameters describing the existing technology or services.

6. The non-transitory computer readable storage medium of claim 1, wherein simulating the service further comprises simulating the service to determine multiple candidate solutions; and
generating the analysis includes generating the analysis for each of the multiple candidate solutions, wherein the analysis of each of the candidate solutions is usable to identify a candidate solution that satisfies a business objective and a technology objective.

7. The non-transitory computer readable storage medium of claim 6, wherein the business objective include minimizing cost, and the technology objective includes satisfying network quality of service constraints for the service.

8. The non-transitory computer readable storage medium of claim 1, wherein the base case model models operational costs and capital expenditures for deploying the service.

9. The non-transitory computer readable storage medium of claim 1, wherein the network cost model models network infrastructure costs for deploying the service.

10. The non-transitory computer readable storage medium of claim 1, wherein the bandwidth model models bandwidth consumed for deploying the service.

11. The non-transitory computer readable storage medium of claim 1, wherein the analysis includes cost and revenue projections over a predetermined period of time for deploying the service and technology requirements for deploying the service over the predetermined period of time.

12. The non-transitory computer readable storage medium of claim 1, wherein the multiple domains include: a radio domain including at least one of end user equipment, cell site, and radio network controllers; a backhaul domain comprising backhaul equipment; a core network domain comprising switches, and an operations domain comprising at least one of fault management equipment, performance management equipment, a billing system, and a customer care system.

13. A decision management system comprising:
data storage to store a base case model, a network cost model and a bandwidth model; and
a simulation engine, executed by a processor to:
simulate a communications network service deployment using business and technology changeable parameters, the base case model, the network cost model and the bandwidth model, wherein the base case model, the network cost model, and the bandwidth model each includes a dependent model parameter dependent on a corresponding model parameter in at least one of the base case model, the network cost model, and the bandwidth model,
generate a candidate solution from the simulation including an analysis of business and technology sub-solutions in the candidate solution, wherein the analysis includes an analysis of the candidate solution across multiple domains of the simulated communications network service deployment, and each domain is a logical sectioning of the simulated communications network service deployment, and each domain is associated with a different technology for providing the simulated communications network service deployment, and changes in one domain impact changes in another domain; and
collect real-time information pertinent to the model parameters and assign values to the model parameters based on the collected real-time information.

14. The decision management system of claim 13, wherein the candidate solution includes estimations of business and technology parameters describing deployment of the simulated deployed service over a period of time into the future.

15. The decision management system of claim 13, further comprising:
a user interface to receive the business and technology changeable parameters from a user and outputting the analysis of the candidate solution to the user.

16. The decision management system of claim 13, wherein the simulation engine is to simulate the communications network service deployment using business and technology constraints and parameters describing an existing service.

17. The system of claim 13, wherein the multiple domains include: a radio domain including at least one of end user equipment, cell site, and radio network controllers; a backhaul domain comprising backhaul equipment; a core network domain comprising switches; and an operations domain comprising at least one of fault management equipment, performance management equipment, a billing system, and a customer care system.

18. A method for analyzing a plurality of scenarios for deploying a communications network service, the method comprising:
receiving a plurality of different sets of business and technology changeable parameters describing the communications network service to be deployed;
a computer system simulating the service multiple times, each time using a different set of the sets of business and technology changeable parameters, wherein each simulation also uses a base case model, a network cost model and a bandwidth model to determine a candidate solution for deploying the service, wherein the base case model, the network cost model, and the bandwidth model each include a model parameter dependent on a corresponding model parameter in at least one of the base case model, the network cost model, and the bandwidth model, wherein the candidate solution includes business and technology sub-solutions;
accessing real-time information pertinent to the model parameters;
assigning values to the model parameters based on the information accessed in real-time; and
generating an analysis for each candidate solution to evaluate an impact of the different sets of the changeable parameters on deploying the service,
wherein generating the analysis includes analyzing the candidate solution across multiple domains of the service, and each domain is a logical sectioning of the service, and each domain is associated with a different technology for providing the service, and changes in one domain impact changes in another domain.

19. The method of claim 18, wherein each dependent model parameter varies in response to the corresponding model parameter in at least one of the other models being varied.

20. The method of claim 18, wherein the multiple domains include: a radio domain including at least one of end user equipment, cell site, and radio network controllers; a backhaul domain comprising backhaul equipment; a core network domain comprising switches; and an operations domain comprising at least one of fault management equipment, performance management equipment, a billing system, and a customer care system.

* * * * *